(12) United States Patent
Chikada

(10) Patent No.: US 6,884,540 B2
(45) Date of Patent: Apr. 26, 2005

(54) BATTERY PACK

(75) Inventor: Tatsuhisa Chikada, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 288 days.

(21) Appl. No.: 09/940,460

(22) Filed: Aug. 29, 2001

(65) Prior Publication Data

US 2002/0025474 A1 Feb. 28, 2002

(30) Foreign Application Priority Data

Aug. 31, 2000 (JP) ........................................ 2000-262154

(51) Int. Cl.$^7$ ................................................ H01M 2/10
(52) U.S. Cl. ........................... 429/99; 429/98; 429/100
(58) Field of Search ........................ 429/7, 9, 96–100, 429/120, 123, 130, 148, 158, 160, 186, 159

(56) References Cited

U.S. PATENT DOCUMENTS

| | | | | |
|---|---|---|---|---|
| 3,923,549 A | * | 12/1975 | Mabuchi et al. | ............... 429/82 |
| 4,576,880 A | * | 3/1986 | Verdier et al. | ................. 429/99 |
| 4,593,461 A | * | 6/1986 | Thiele et al. | ............... 29/623.1 |
| 6,376,122 B1 | * | 4/2002 | Cheeseman | ................... 429/99 |

FOREIGN PATENT DOCUMENTS

| | | | |
|---|---|---|---|
| CN | 1227002 | 8/1999 | |
| JP | 2000100401 | 4/2000 | |
| WO | 98/40918 | 9/1998 | |
| WO | WO 00/46865 | * 8/2000 | ............ H01M/2/10 |

OTHER PUBLICATIONS

English Language Abstract of JP 2000–100401, Apr. 2000.

* cited by examiner

Primary Examiner—Stephen Kalafut
Assistant Examiner—Tracy Dove
(74) Attorney, Agent, or Firm—Greenblum & Bernstein, P.L.C.

(57) ABSTRACT

A plurality of secondary batteries are connected either one of in series or in parallel with metal plates, and are joined by connection plates to form a unit with spacing provided between the secondary batteries disposed in parallel. Also, when arranging an odd number of the secondary batteries, an arrangement is also possible where a connection plate at an end point of an even number of the secondary batteries is joined to the remaining battery so that the secondary batteries can be arranged in a different shape. The spacing improves the heat radiation capability of the secondary batteries, and a pressing force is prevented from being applied to the secondary batteries by forming supporting struts in the spacing.

8 Claims, 5 Drawing Sheets

BATTERY PACK

The present disclosure relates to subject matter contained in priority Japanese Patent Application No. 2000-262154, filed on Aug. 31, 2000, the contents of which is herein expressly incorporated by reference in its entirety.

BACKGROUND OF THE INVENTION

1. Technical Field of the Invention

The present invention relates to a battery pack used as a power source for portable equipment such as notebook-sized personal computers (hereafter referred to as "notebook computers"), portable information terminal equipment, and the like. More specifically, the present invention relates to a battery pack in which a heat radiation capability and a resistance to a pressing force are taken into consideration.

2. Description of Related Art

When a high voltage-output or a high battery capacity is required for a battery as a power source for portable equipment, a battery pack is formed with a plurality of secondary batteries connected either one of in series and in parallel. The battery pack is composed of a plurality of secondary batteries and circuit boards composed of a power supply circuit and other circuits. This is either in a form in which the batteries and the circuit boards are stored and unitized in a pack case or in a form of an assembly of batteries in which the batteries and the circuit boards are unitized either by a heat-shrinkable tube or an adhesive tape.

As portable equipment is miniaturized, the miniaturization of a battery pack is also required, and a plurality of secondary batteries tend to be unitized in a state where they are closely disposed to each other. However, a secondary battery produces heat while charging and discharging, and even a little amount of heat is not sufficiently radiated when a plurality of secondary batteries are disposed in a state in which they are in close contact with each other. As a result, in a closed space in a pack case, the temperature of the batteries rises which affects the charging-discharging characteristics of the batteries.

In Japanese Patent Publication No. 2000-100401, a battery pack is disclosed which eliminates the drawback resulting from closely disposed secondary batteries as an example of an earlier patent application. In the battery pack disclosed in this publication, when a plurality of secondary batteries with a cylindrical shape are disposed in parallel in such a way that the side surfaces of the batteries are in contact with each other, spacers 43 are provided between the cylindrical secondary batteries 12 as shown in FIG. 10 and FIG. 11. In the spacer 43, openings 48 and 49 are formed in a direction in which the spacer 43 contacts the side surfaces of the cylindrical columns of the secondary batteries and in a direction perpendicular to that direction respectively. In this way heat radiation from the secondary batteries is improved.

When the number of secondary batteries in a battery pack increases and they are disposed on a flat surface, the area occupied by the battery pack increases, and, as a result, a larger space for storing the battery pack is needed in a pack case or in equipment. Also, a pressing force from the outside which is applied to the battery pack in turn applies a pressing force to the secondary batteries. To prevent the increasing of internal pressure of the secondary batteries by the effect of a pressing force, a supporting structure such as a supporting strut needs to be provided in the storage space of a pack case or equipment. Particularly, in a secondary battery 2, shown in FIG. 12, with a flat rectangular shape and a large plane area, a supporting structure is essential. The spacer 43 used in the conventional battery pack described above is adapted for secondary batteries 12 with a cylindrical shape, and, as shown in FIG. 12, when the spacer is used for the secondary batteries 2 with a flat shape, the opening 48 can be used as a hole for letting through a supporting strut. However, because the spacer 43 is not a connecting element, connection strength sufficient to connect any number of batteries with a flat shape cannot be obtained. Also, the battery pack storage space in equipment is not always of a rectangular shape. The battery pack storage space may be a shape, which is not rectangular, that cannot be dealt with by the spacer 43. Therefore, a battery pack that is desired is such that it can provide a larger open space between each of the secondary batteries 2 arranged in parallel, and that the space provided improves the heat radiation capability and allows the positioning of a supporting structure.

SUMMARY OF THE INVENTION

An object of the invention is to provide a battery pack that can cope with various storage space shapes by forming a space between a plurality of batteries for heat radiation and the enhancement of the rigidity of the battery pack.

In the battery pack according to the present invention for achieving the object described above, a plurality of secondary batteries are electrically connected, and are disposed in parallel with a predetermined spacing. Surfaces where electrode terminals of the secondary batteries are provided are connected with electrical insulating plates. As described above, the secondary batteries are connected by the electrical insulating plates, and at the same time the batteries are disposed in parallel with a predetermined spacing. By repeating this arrangement any number of times in the parallel direction, the plurality of batteries are disposed in parallel with a spacing and are unitized. Thereby a good heat radiation capability is provided, and a force compressing the secondary batteries is prevented from being applied by arranging supporting bodies such as supporting struts and the like in the spacing.

In the constitution described above, the electrical insulating plates are adhered on the surface where electrode terminals are provided, so that the connection between the secondary batteries is secured.

Also, because each electrode terminal of the secondary batteries is connected with metal plates, and the electrical insulating plates are adhered on the metal plates, electrical and mechanical connections are made at the same positions. Also the metal plates that are thin and have a low mechanical strength can be protected by the electrical insulating plates.

It is preferable that the electrical insulating plate is a resin plate with an adhesive treatment applied to both the surfaces of the resin plate, and the insulating plate connects the secondary batteries.

Also, when an even number of secondary batteries, disposed in parallel with a predetermined spacing, which are taken from an odd number of secondary batteries are connected to each other by the electrical insulating plates, and the remaining secondary battery is connected, positioned in an appropriate direction, to the electrical insulating plate located at an end point of the assembly of the even number of secondary batteries, the secondary batteries adapts to battery storage spaces of various shapes. In this way an odd number of secondary batteries that are difficult to arrange can be connected to each other as a unit.

The arrangement of the plurality of secondary batteries is made to correspond to the shape of the storage space for secondary batteries. Also, the arrangement of the batteries in which they are disposed in parallel as well as the number of batteries to be disposed in the layout is selectively combined depending on the shape of the storage space. In this way, the secondary batteries have a high degree of freedom of arrangement.

Also, the secondary battery with a flat rectangular shape is suitable for the purpose described above.

Furthermore, by binding connected or joined secondary batteries, disposed in parallel, with an adhesive tape, the unitized structure of a plurality of connected or joined secondary batteries can be strengthened.

While novel features of the invention are set forth in the preceding, the invention, both as to organization and content, can be further understood and appreciated, along with objects and features thereof, from the following detailed description and examples when taken in conjunction with the attached drawings.

DESCRIPTION OF THE PREFERRED EMBODIMENTS

Figure 1:
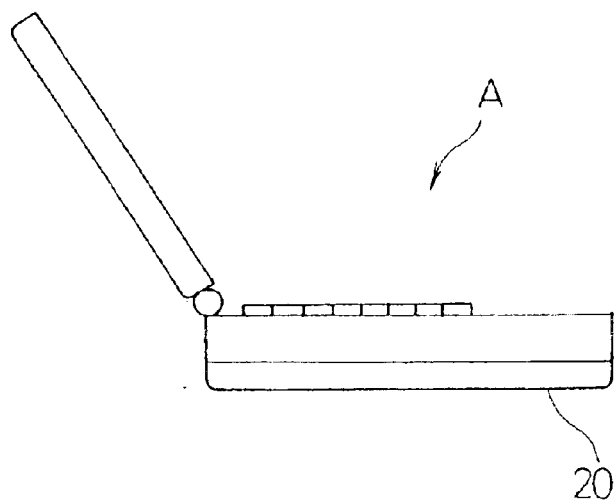
FIG. 1 is a side view of a notebook computer to which a battery pack in accordance with an embodiment of the present invention.

The embodiment of the present invention describes a battery pack adapted for a battery power source for a notebook computer. As shown in FIG. 1, the battery pack is formed in a shape that can be stored in a battery storage space within an additional case 20 detachably mounted at the bottom surface of a notebook computer A.

Figure 2:
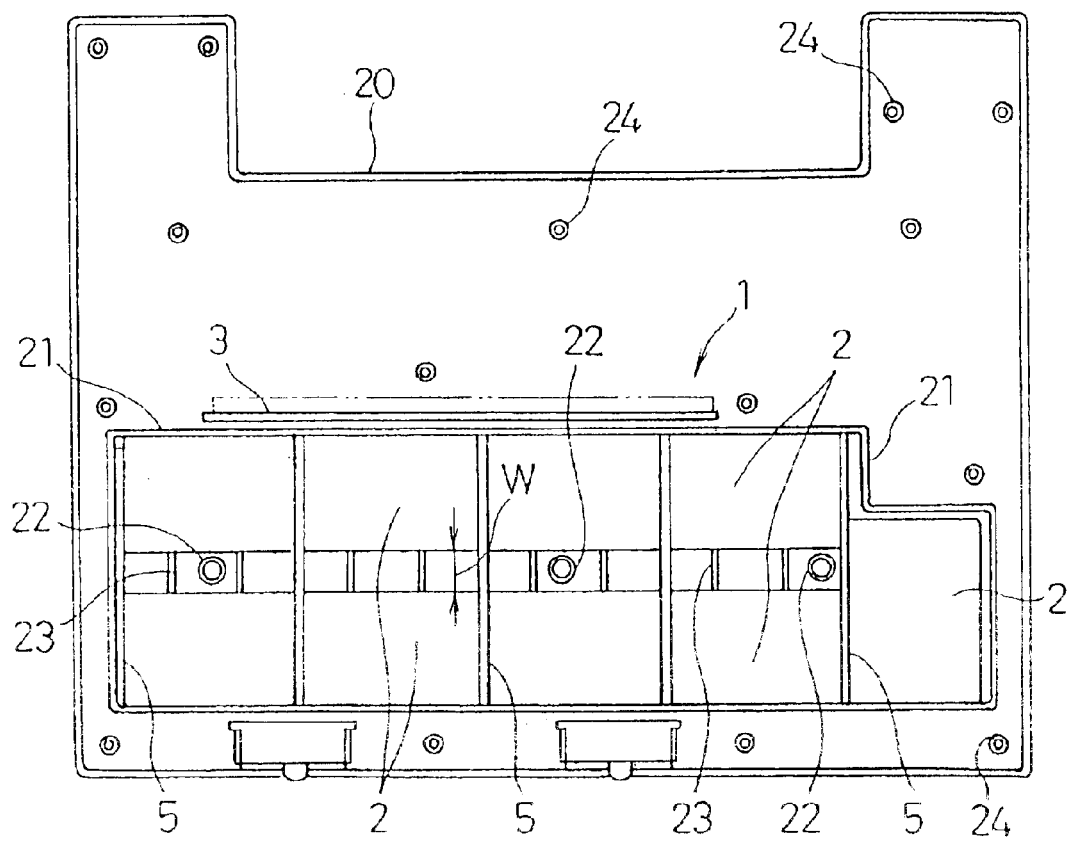
FIG. 2 is a plan view showing a laid-out state of a battery pack in an additional case.

FIG. 2 is a plan view showing a state in which a battery pack 1 relating to the present invention is stored within the additional case 20, and, in the figure, the additional case 20 is in a state in which a cover to be fixed over the shown plane is removed. The cover is formed in a plate-like shape, and is fixed with screws to a plurality of bosses 24 with internally threaded elements inserted therein. The battery pack 1 is provided with nine secondary batteries stored in a battery storage frame 21 formed in the additional case 20, and with a circuit board 3 constituting a battery protection circuit, circuits for communicating with the notebook computer A, and other circuits. The secondary batteries 2 are lithium-ion type secondary batteries formed with a flat rectangular shape, and eight of the secondary batteries 2 are disposed in parallel with a predetermined spacing W secured by connection plates 5. The remaining single secondary battery is joined to the connection plate 5 at an end point of the eight secondary batteries 2.

The weight of the notebook computer A applies on the additional case 20. Supporting struts 22 are formed in the additional case 20 in such a way that they are positioned in the spacing W between the secondary batteries disposed in parallel. In this way a pressing force from a human body applied to the notebook computer A, particularly the pressing force applied to a point directly above the stored part of the battery pack 1, does not affect the secondary batteries 2. The height of the supporting struts 22 is made equal to that of the battery storage frame 21, and the deflection of the cover is supported with the supporting struts 22 and the battery storage frame 21 to prevent the pressing force from being applied to the secondary batteries 2. Also, positioning ribs 23, the positions of which correspond to the positions of the spacing W between the secondary batteries disposed in parallel, are provided, so that the secondary batteries 2 can be positioned while still maintaining the spacing W.

The battery pack 1 in which the plurality of secondary batteries 2 are disposed with the spacing W and at the same time unitized in a shape which is not rectangular, as described above, will now be described in detail.

Figure 3:
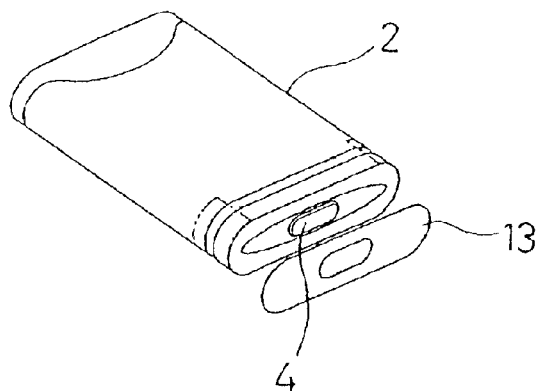
FIG. 3 is a perspective view showing a preparatory process of a secondary battery.
Figure 4:
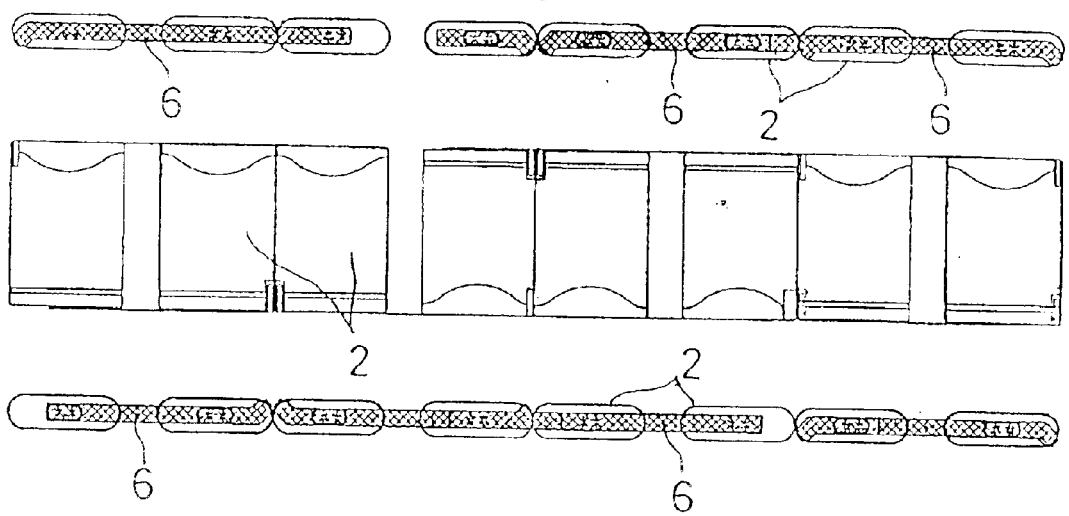
FIG. 4 is an explanatory drawing showing a process of joining the secondary batteries with lead plates for assembling the battery pack.
Figure 5:
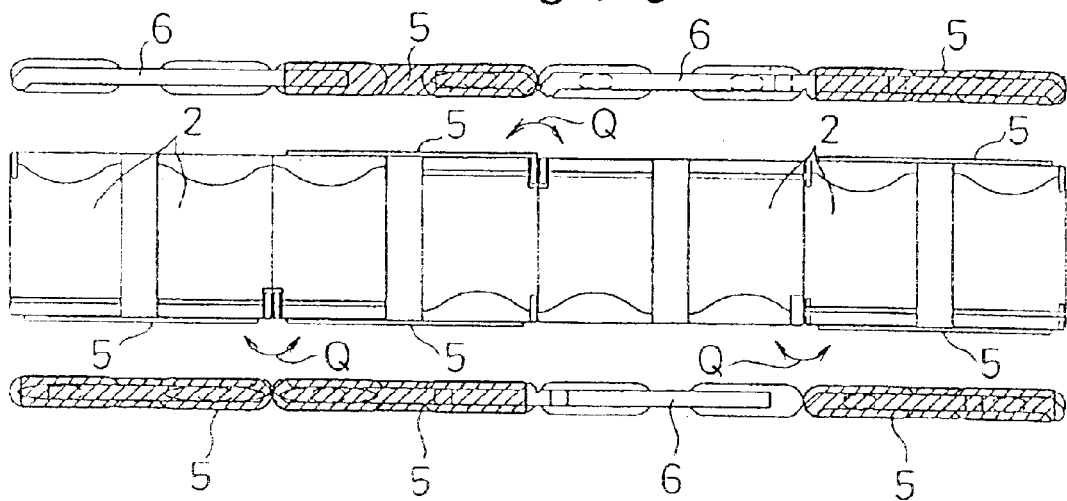
FIG. 5 is an explanatory drawing showing a process of gluing connection plates on the secondary batteries for assembling the battery pack.
Figure 6:
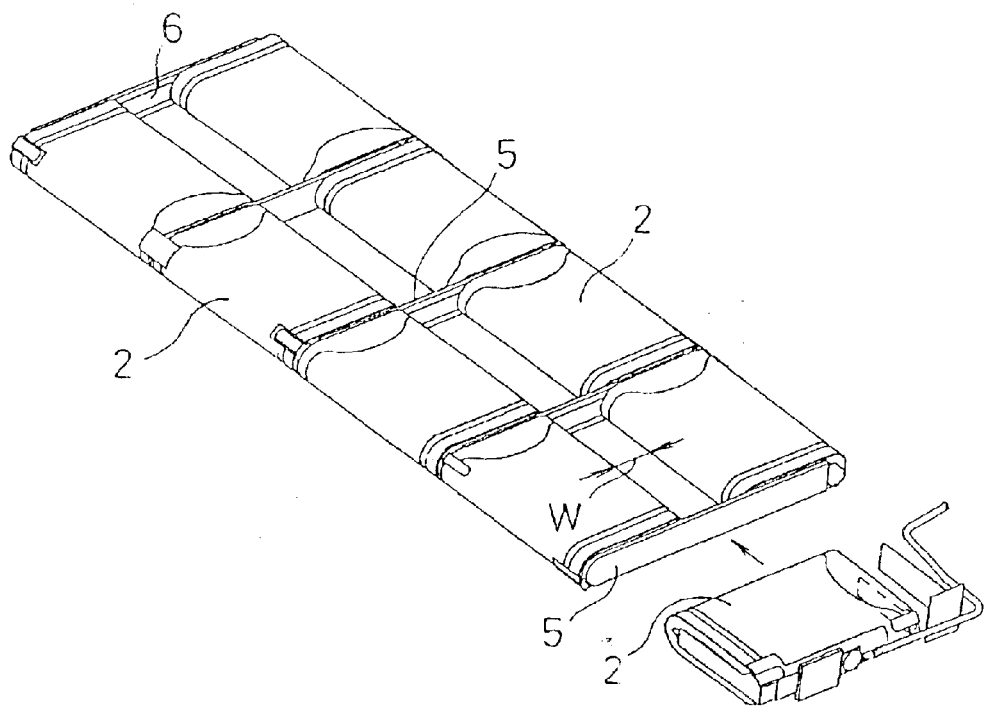
FIG. 6 is a perspective drawing showing a process of laying out the secondary batteries for assembling the battery pack.

As shown in FIG. 3, an insulation paper 13 adheres to a surface where a positive terminal 4 of the secondary battery 2 is formed. As shown in FIG. 4, eight of the secondary batteries 2 are laid side by side on a jig and joined together with lead plates 6. Furthermore, as shown in FIG. 5, connection plates 5, to both sides of which an adhesive treatment is applied, adhere to the required parts. The connection plates 5 are resin plates which have an electrical insulation property and excellent rigidity, and are formed in a shape corresponding to that of a cross section of the secondary battery 2. In an assembly of the eight secondary batteries that are connected and adhered with the lead plates 6 and connection plates 5, when the assembly is opened at opening positions Q, shown in FIG. 5, between the secondary batteries 2 that are in contact with each other, a state is obtained in which the eight secondary batteries 2 are disposed in parallel with the spacing W as shown in FIG. 6. When a side surface of one secondary battery 2 is adhered, as shown in FIG. 6, to a connection plate 5 at an end point of the eight secondary batteries 2 in a connected state, and an adhesive tape 7 adheres, as shown in FIG. 7, to both sides of flat planes across each of the secondary batteries, the nine secondary batteries are solidly unitized.

Figure 7:
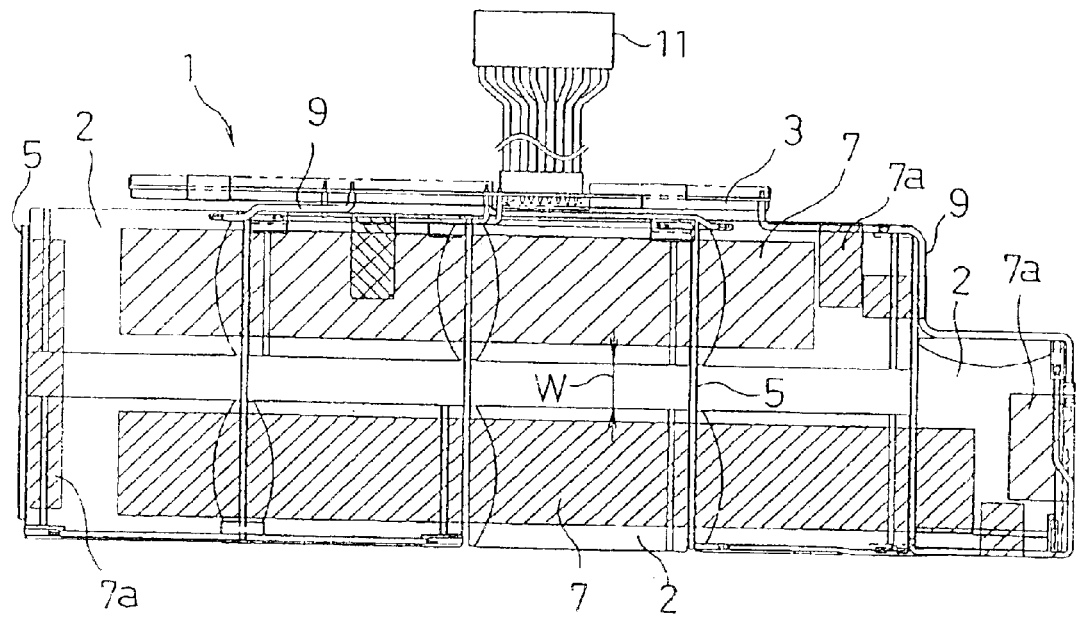
FIG. 7 is a plan view showing a completed state of the battery pack.

FIG. 7 shows a completed state of the battery pack 1, wherein lead wires 9 for connecting the secondary batteries 2 to each other and for connecting the secondary batteries to the circuit board 3 are wired, and strips with a small area of adhesive tape 7a adhere to the required parts for organizing the lead wires 9 and fixing the circuit board 3. Also, a connector 11 extends out of the circuit board 3 for the connection to the notebook computer A. In the battery pack 1, because the composing elements are unitized, the battery pack 1 is supplied in the above-described state to a manufacturer of the notebook computer A, and a battery power source to be added to the notebook computer A is easily fabricated by the manufacturer by storing the battery pack 1 in the additional case 20. Furthermore, when the battery pack 1 is prepared in a predetermined form, it is also integrated in the notebook computer A.

Figure 8:
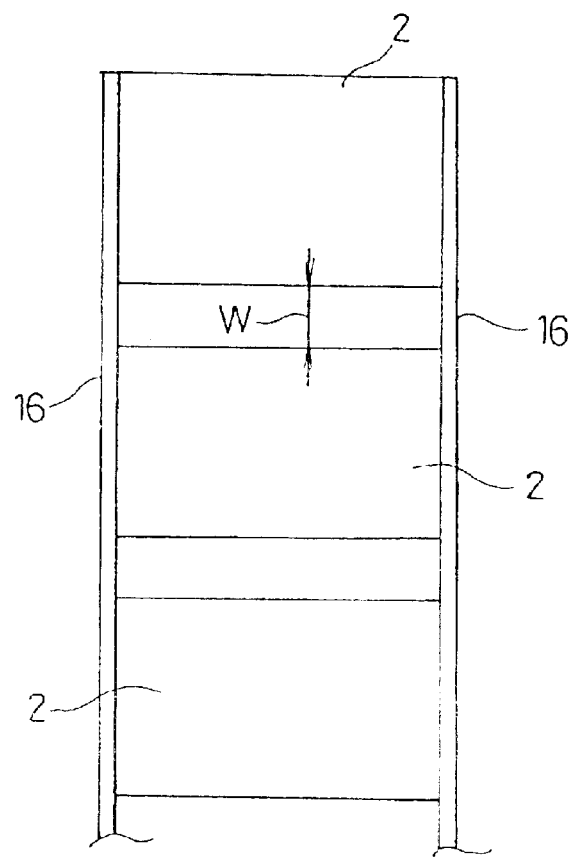
FIG. 8 is a plan view showing another embodiment of the layout of the secondary batteries.

As shown in FIG. 8, the plurality of secondary batteries 2 can also be laid out in such a way that two or more pieces of the secondary batteries 2 are disposed in parallel with the predetermined spacing W. The length of an electrical insulating plate 16 depends on the number of the secondary batteries 2. Thus, the secondary batteries 2 are made to correspond to the shape of the battery storage space, and a layout design is possible in which the batteries are freely disposed.

Figure 9:
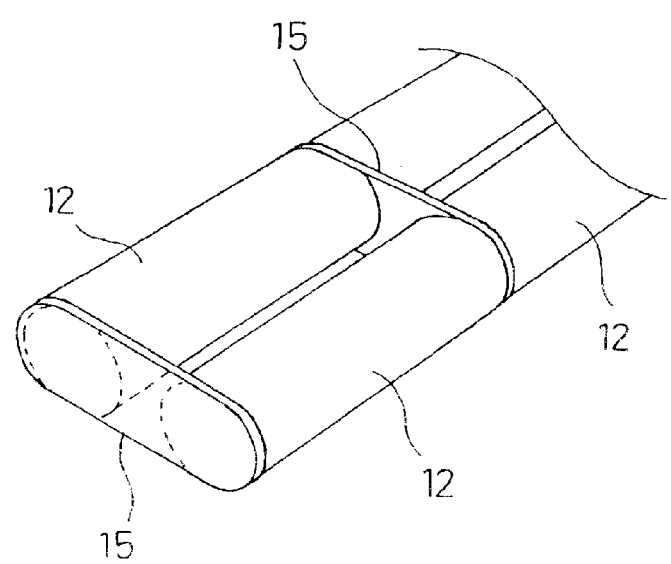
FIG. 9 is a perspective view showing still another embodiment applied to the secondary batteries with a cylindrical shape.
Figure 10:
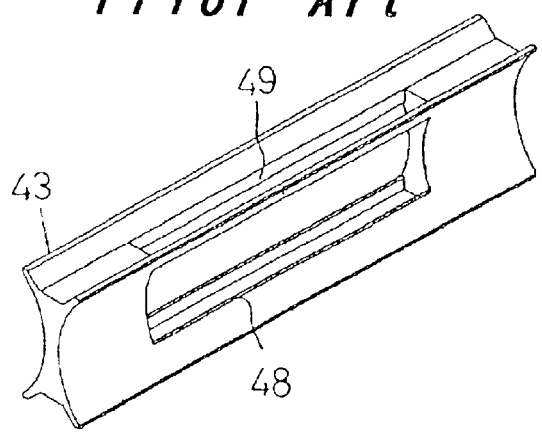
FIG. 10 is a perspective view showing the composition of a spacer of a prior art.
Figure 11:
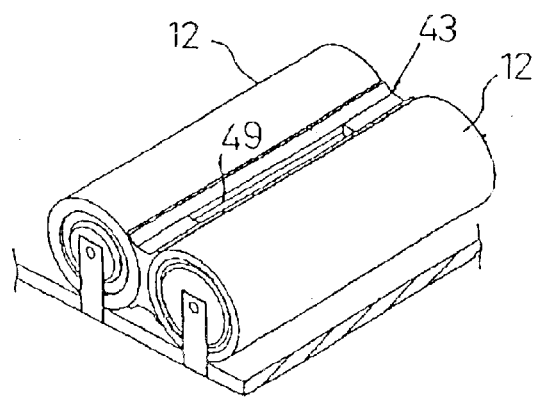
FIG. 11 is a perspective view showing a laid-out state of the secondary batteries using the spacer in FIG. 10.
Figure 12:
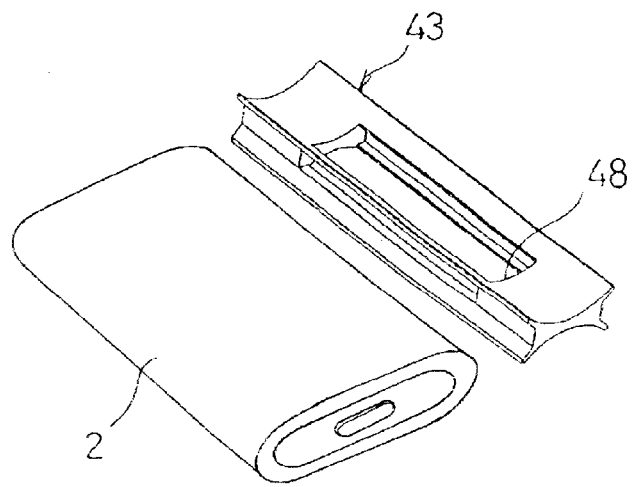
FIG. 12 is a perspective view showing an example in which the spacer in FIG. 10 is applied to the secondary batteries with a flat rectangular shape.

Also, as shown in FIG. 9, it is also possible to dispose in parallel the secondary batteries 12 with a cylindrical shape to connect them with the electrical insulating plates 15.

In a battery pack according to the present invention, a space is formed between the secondary batteries and consequently the heat radiation capability of the secondary batteries is improved. At the same time, supporting bodies for supporting a pressing force acting on the secondary batteries are provided in the space so that the secondary batteries are prevented from being pressed. Also, because a plurality of secondary batteries can be freely laid out, the secondary batteries can be made to correspond to the shape of the battery storage space.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A battery pack comprising:
  a plurality of secondary batteries disposed in parallel with a predetermined spacing, the secondary batteries being electrically connected in either one of in series or in parallel;
  an electrical insulating plate for connecting surfaces of the secondary batteries where electrode terminals are provided; and
  a case that stores the plurality of secondary batteries therein, the case having at least one strut extending therefrom in the predetermined spacing between the secondary batteries and spaced from the secondary batteries.

2. The battery pack according to claim 1, wherein electrode terminals of the secondary batteries are connected to each other with metal plates, and the electrical insulating plates are adhered on the metal plates.

3. The battery pack according to claim 1, wherein the electrical insulating plate is a resin plate with an adhesive treatment applied to both its surfaces, and the insulating plate connects the secondary batteries with is adhesion.

4. The battery pack according to claim 1, wherein when the number of the secondary batteries is an odd number, the electrical insulating plate on an end part of an assembly of an even number of the secondary batteries arranged in parallel with a predetermined spacing is connected to the remaining secondary battery.

5. The battery pack according to claim 1, wherein the plurality of secondary batteries are arranged corresponding to a shape of a storage space for the secondary batteries.

6. The battery pack according to claim 1, wherein the secondary batteries are of a flat rectangular shape.

7. The battery pack according to claim 1, wherein the secondary batteries are bound together with an adhesive tape.

8. A battery pack comprising:
  a plurality of secondary batteries disposed in parallel with a predetermined spacing, the secondary batteries being electrically connected in either one of in series or in parallel; and
  an electrical insulating plate for connecting surfaces of the secondary batteries where electrode terminals are provided;
  wherein when the number of the secondary batteries is an odd number, the electrical insulating plate on an end part of an assembly of an even number of the secondary batteries arranged in parallel with a predetermined spacing is connected to the remaining secondary battery.

* * * * *